(12) United States Patent
Szonn et al.

(10) Patent No.: US 7,934,150 B1
(45) Date of Patent: Apr. 26, 2011

(54) METHOD AND GUI FOR MANAGING OUTPUT SETTINGS IN A FORM-BASED APPLICATION

(75) Inventors: Sabina Szonn, San Diego, CA (US); Morris Neer, San Diego, CA (US); Martin Lewandowski, San Diego, CA (US); Leslie Skelly, San Diego, CA (US); Phillip J. Ohme, San Diego, CA (US); Matthew G. Rice, San Diego, CA (US); Stephen J. Seiler, San Diego, CA (US); Richard Neil Preece, San Diego, CA (US); Helen Welbourn, El Cajon, CA (US); Maude Harris, Heathsville, VA (US)

(73) Assignee: Intuit Inc., Mountain View, CA (US)

( * ) Notice: Subject to any disclaimer, the term of this patent is extended or adjusted under 35 U.S.C. 154(b) by 1178 days.

(21) Appl. No.: 11/445,038

(22) Filed: May 31, 2006

(51) Int. Cl.
*G06F 17/21* (2006.01)
*G06F 17/22* (2006.01)

(52) U.S. Cl. ............. 715/221; 715/845; 705/31; 705/26

(58) Field of Classification Search .................. 715/221, 715/845
See application file for complete search history.

(56) References Cited

U.S. PATENT DOCUMENTS

| | | | |
|---|---|---|---|
| 5,640,580 A | 6/1997 | Slayden et al. | |
| 5,772,251 A * | 6/1998 | Fleck | 283/115 |
| 7,234,103 B1 | 6/2007 | Regan | |
| 7,610,227 B2 * | 10/2009 | Wyle | 705/31 |
| 2002/0111888 A1 * | 8/2002 | Stanley et al. | 705/31 |
| 2003/0036912 A1 | 2/2003 | Sobotta et al. | |
| 2006/0155618 A1 * | 7/2006 | Wyle | 705/31 |
| 2007/0106560 A1 * | 5/2007 | Shields | 705/26 |

OTHER PUBLICATIONS

Newmark, Richard I, "Taxact 2000 Standard and Taxact 2000 Deluxe", 2001, Journal of the American Taxation Association, pp. 1-13.*

Amrutharaj PG et al,"Web-Based Tax Filing System", ACM, 2005, pp. 1-33.*

* cited by examiner

*Primary Examiner* — Doug Hutton
*Assistant Examiner* — James J Debrow
(74) *Attorney, Agent, or Firm* — Osha • Liang LLP

(57) ABSTRACT

A computer-readable medium includes instructions for managing output settings in a form-based application by modifying a first output setting control associated with a first output version of a form of the form-based application, initiating outputting the first output version based on modifying the first output setting control, and initiating outputting a second output version based on a second output setting control.

23 Claims, 6 Drawing Sheets

Form 10

FIGURE 1

METHOD AND GUI FOR MANAGING OUTPUT SETTINGS IN A FORM-BASED APPLICATION

BACKGROUND

Many software applications today are form-based in that they offer the ability to manage, modify, and output multiple forms associated with a common task. For example, financial management software may include a number of forms associated with a client, project, or user, including billing summaries, expense reports, payroll reports, insurance forms, tax forms, etc. Form-based applications may also be used in other subject areas, such as project planning, resource management, medicine, or any other subject area where forms provide utility.

In many cases, a user of a form-based application is required to generate a plurality of output versions of the forms, where the output versions may differ, for example in the specific forms outputted, the number of copies of a form, the intended recipient of the form, or any other type of output version difference. Managing multiple output versions of forms is a complicated task, which may require modifying a large number of output settings across multiple interfaces prior to outputting each version.

SUMMARY

In general, in one aspect, the invention relates to a computer-readable medium comprising instructions for managing output settings in a form-based application by modifying a first output setting control associated with a first output version of a form of the form-based application, initiating outputting the first output version based on modifying the first output setting control, and initiating outputting a second output version based on a second output setting control.

In general, in one aspect, the invention relates to a graphical user interface for managing output settings in a form-based application, comprising a first output setting control associated with a first output version of a form of the form-based application, and a navigation interface configured to display a title of the form in a forms subgroup, and enable a modification of the first output setting control, wherein the first output version of the form is outputted based on the modification of the first output setting control and a second output version of the form is outputted based on a second output setting control.

Other aspects and benefits of the invention will be apparent from the following description and the appended claims.

BRIEF DESCRIPTION OF DRAWINGS

FIG. 1 shows a graphical representation of a form in accordance with one or more embodiments of the invention.

DETAILED DESCRIPTION

Figure 2:
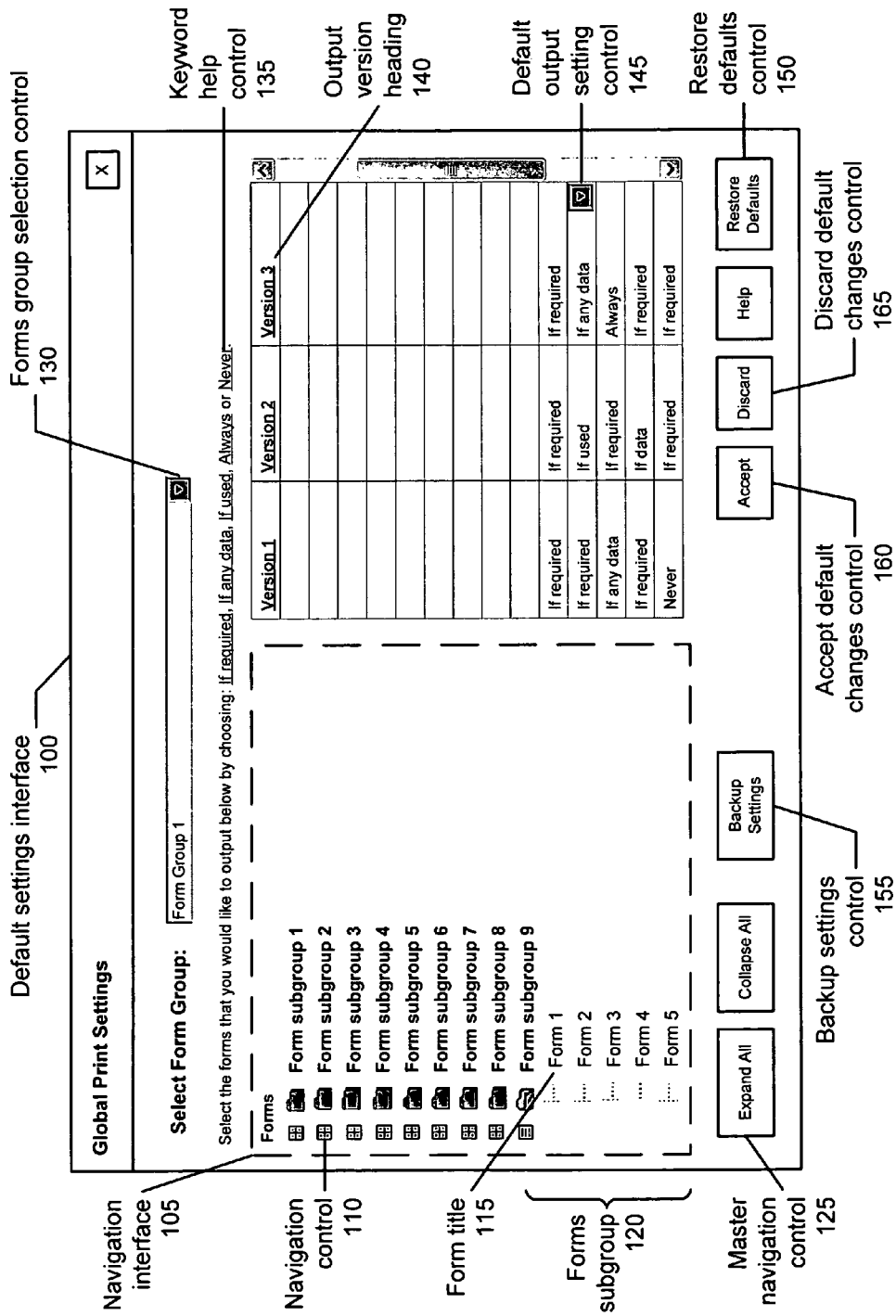
FIGS. 2-4 shows graphical representations of a graphical user interface in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and graphical user interface for managing output settings in a form-based application.

Figure 1:
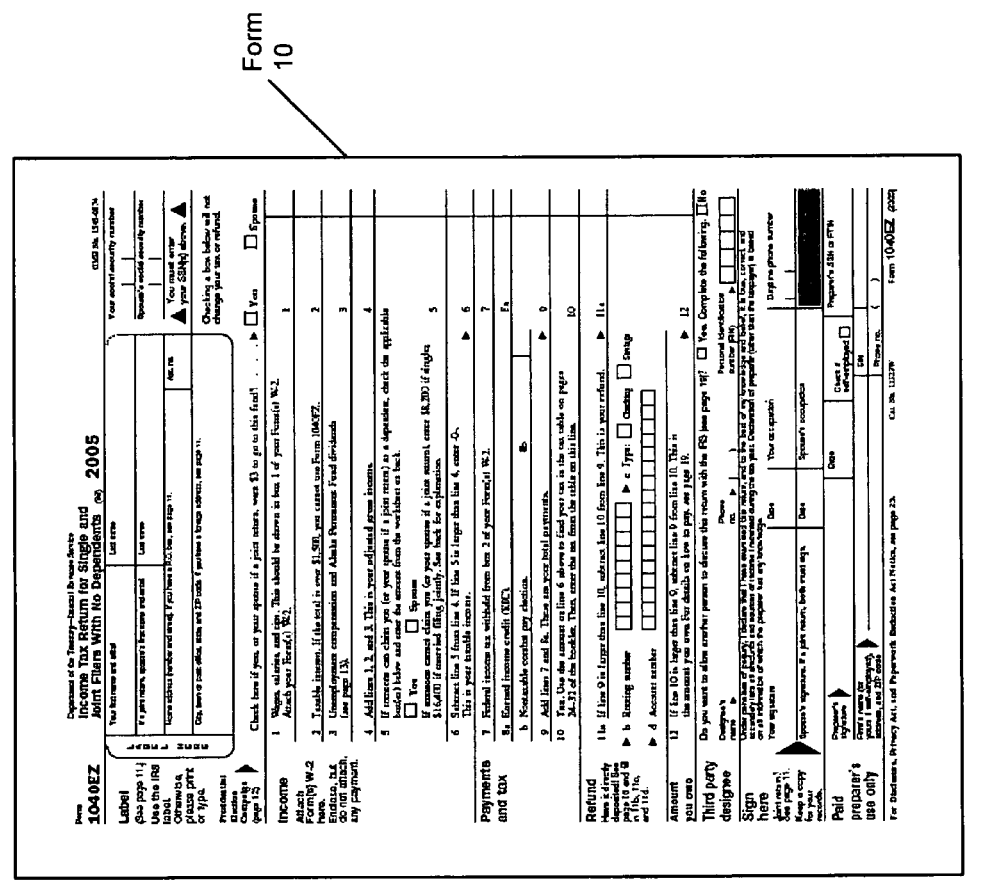

FIG. 1 shows a diagram of a form in accordance with one or more embodiments of the invention. The form (10) may be a financial form such as a tax form, a budgetary form, a financial reporting form, or any other type of financial form. Alternatively, the form (10) may be a medical form, an insurance form, a contractual form, or any other type of form. The form (10) may be associated with a plurality of output versions (not shown), such as a filing version, a client version, a preparer version, a practitioner version, a summary version, a comprehensive version, a draft version, or any other type of output version. Those skilled in the art will appreciate that having multiple output versions of the form (10) may allow a user to customize and output each output version separately.

FIG. 2 shows a diagram of a default settings interface in accordance with one or more embodiments of the invention. In one or more embodiments, the default settings interface (100) includes a navigation interface (105) configured to display a form title (115) associated with the form (10). The navigation interface (105) may be a hierarchical navigation structure, a list, tabs, selectable images or text, a rotating display, or any other type of interface. The form title (115) may be a file name, a document number, information extracted from metadata of the form (10), a representative image, or any other type of title.

In one or more embodiments, the form title (115) is displayed within a forms subgroup (120). The forms subgroup (120) may be associated with a forms category, a predetermined or dynamic filter, contextual criteria, or any other basis for a subgroup. Further, the forms subgroup (120) may be displayed as a hierarchical entity, an image, text, or any other type of subgroup representation. In one or more embodiments, the navigation interface (105) includes a navigation control (110) configured to navigate to/from the form title (115) and/or forms subgroup (120). The navigation control (110) may be a selectable image or text, a keyboard shortcut, a dropdown (i.e., a selection field which only displays one choice at first; the rest of the list is revealed when the user clicks and holds the mouse button down, or takes some other action), a checkbox, a dynamic list, or any other type of control for navigating the navigation interface (105). Those skilled in the art will appreciate that the navigation interface (105) may allow for efficient displaying numerous form titles and/or forms subgroups.

In one or more embodiments, the default settings interface (100) also includes a forms group selection control (130) configured to select a forms group to which the form title (115) and/or forms subgroup (120) belong. The forms group selection control (130) may be a selectable image or text, a keyboard shortcut, a dropdown, a checkbox, a dynamic list, or any other type of selection control. Those skilled in the art will appreciate that the form titles and/or forms subgroups displayed in the navigation interface (105) may change based on a selection of the forms group selection control (130). Further, those skilled in the art will appreciate that the forms group selection control (130) may allow a user to quickly navigate to a form title (115) and/or change settings for output versions of forms in multiple forms subgroups.

In one or more embodiments, the default settings interface (100) includes a master navigation control (125) configured to perform navigation operations on a plurality of form titles and/or forms subgroups. The master navigation control (125) may be a selectable image or text, a keyboard shortcut, a dropdown, a dynamic list, or any other type of control providing master navigation functionality. Navigation operations performed by the master navigation control (125) may include expanding all forms subgroups, collapsing all forms subgroups, selecting a plurality of form titles, or any other type of navigation action performed on a plurality of form titles and/or forms subgroups. Those skilled in the art will appreciate that a master navigation control (125) may allow rapid navigation of the navigation interface (105).

In one or more embodiments, the default settings interface (100) includes a default output setting control (145) describing a default criterion for outputting an output version of the form (10). The default output setting control (145) may be a dropdown, a checkbox, an input field, a button, or any other type of setting control. In one or more embodiments, the default output setting control (145) is displayed in conjunction with an output version heading (140) identifying the output version of the form (10) with which the default output setting control (145) is associated. The output version heading (140) may be an image, text, animation, font property, or any other type of heading for identifying an output version.

In one or more embodiments, the default output setting control (145) is enabled to accept a selection or input from a user to change its value. In one or more embodiments, the default settings interface (100) also includes a restore defaults control (150) configured to restore the default output setting control (145) to an initial value, an accept default changes control (160) configured to accept a selection or input to the default output setting control (145), and/or a discard default changes control (165) configured to discard a selection or input to the default output setting control (145). Those skilled in the art will appreciate that accepting a selection or input to the default output setting control (145) may include storing a new value in a database, in a file, in volatile storage, or any other type of settings acceptance action.

In one or more embodiments, the default settings interface (100) includes a backup settings control (155) configured to backup the present value of the default output setting control (145). The backup may be performed to a printing device, a file, a database, or any other type of backup storage. Those skilled in the art will appreciate that restoring a setting value from a backup may or may not require user input of the values. Those skilled in the art will appreciate that the backup settings control (155) may allow a user to readily restore settings in the event of a hardware or software failure, software upgrade, or any other scenario in which settings have expectedly or unexpectedly changed.

In one or more embodiments, the default settings interface (100) includes a keyword help control (135) configured to provide help associated with a keyword. In one or more embodiments, the keyword help control (135) may enable a help dialog (not shown), a vocal help message, or any other type of keyword help.

Figure 3:
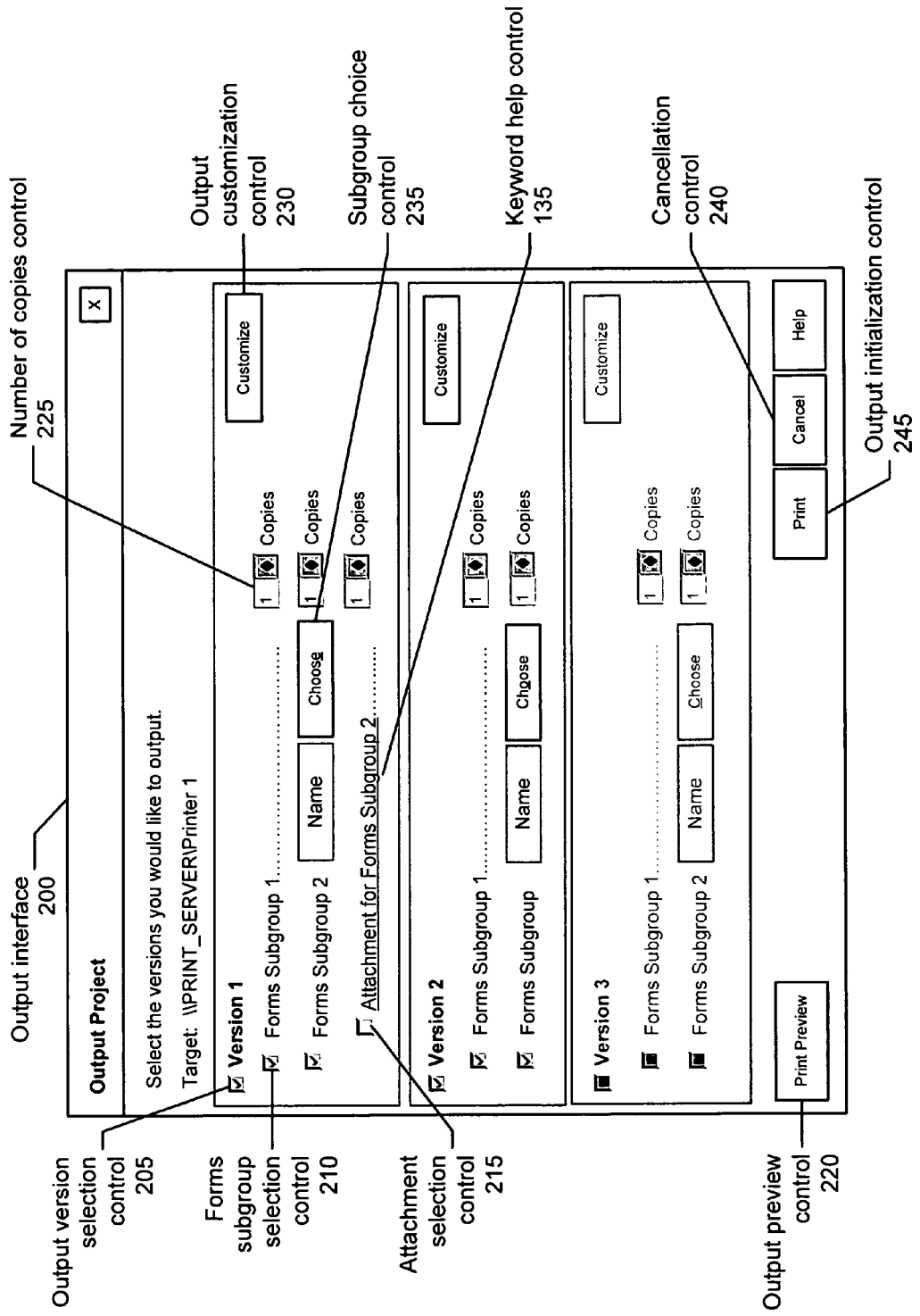

FIG. 3 shows a diagram of an output interface in accordance with one or more embodiments of the invention. In one or more embodiments, the output interface (100) includes an output version selection control (205) for selecting an output version of the form (10) to be outputted. Specifically, the output version selection control (205) may be associated with same output version of the form (10) as the default output setting control (145). The output version selection control (205) may be a checkbox, dropdown, button, selectable image or text, or any other type of selection control.

In one or more embodiments, the output interface (200) includes a forms subgroup selection control (210) for selecting a forms subgroup (120) of the output version to be outputted. The forms subgroup (120) may be any type of subgroup as described above in relation to FIG. 2. The forms subgroup selection control (210) may be a dropdown, a checkbox, a list, a selectable image or text, or any other type of selection control. Further, in one or more embodiments, the output interface (200) includes a subgroup choice control (235) for selecting a forms subgroup (120) to be associated with the forms subgroup selection control (210). The subgroup choice control (235) may be a link to a subgroup choice interface, a dropdown, a list, a checkbox, or any other type of control for choosing a subgroup. Those skilled in the art will appreciate that the subgroup choice control (235) may facilitate selection of a particular forms subgroup (120) to be outputted.

In one or more embodiments, the output interface (200) includes an attachment selection control (215) for selecting an attachment (not shown) associated with the output version to be outputted. Those skilled in the art will appreciate that the attachment selection control (215) may not be enabled if the output version selection control (205) or forms subgroup selection control (210) is not selected, and that the presence or enablement of the attachment selection control (215) may depend, for example, on using the subgroup choice control (235). The attachment selection control (215) may be a dropdown, a list, a checkbox, a selectable image or text, or any other type of selection control.

In one or more embodiments, the output interface (200) includes a number of copies control (225) configured to indicate a number of times to output the output version of the form (10). The number of copies control (225) may be a dropdown, an input field, or any other type of control for selecting a number of copies to output. Further, in one or more embodiments, the output interface (200) includes an output customization control (230) configured to display an output customization interface (300). The output customization interface (300) is described in further detail below. The output customization control (230) may be a tab, a hyperlink, a selectable image or text, or any other type of control.

In one or more embodiments, the output interface (200) includes an output preview control (220) configured to provide a preview of the output version of the form (10) prior to outputting. The output preview control (220) may be a tab, a hyperlink, a selectable image or text, or any other type of control. Further, in one or more embodiments, the output interface (200) includes an output initialization control (245) configured to initialize outputting the output version of the form (10) associated with the output version selection control (205). The output initialized may be a paper document, an electronic document such as a text file, Portable Document Format (PDF), Microsoft® Word document, image, or any other type of output. Those skilled in the art will appreciate that additional output steps may be performed by another application, such as a print driver, document creation interface, image rendering interface, or any other type of output application.

In one or more embodiments, the output interface (200) includes a cancellation control (240) configured to close the output interface (200). Those skilled in the art will appreciate that the cancellation control (240) may also restore some or all values of other elements of the output interface (200) to a previous state. Further, in one or more embodiments, the output interface (200) includes a keyword help control (135) having functionality as described above in relation to FIG. 2.

Figure 4:
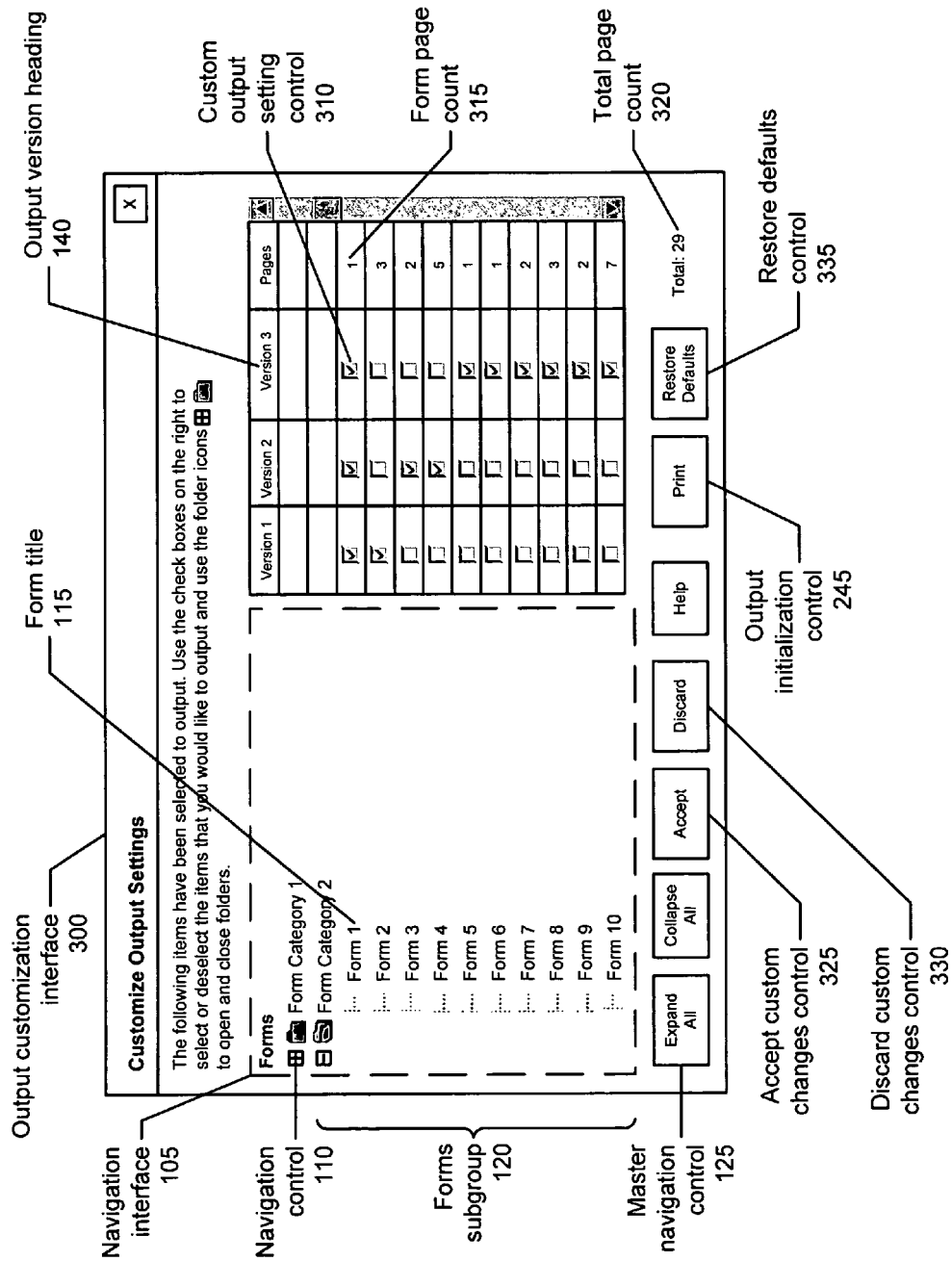

FIG. 4 shows a diagram of an output customization interface in accordance with one or more embodiments of the invention. In one or more embodiments, the output customization interface (300) is displayed using an output customization control (230). Those skilled in the art will appreciate that there may be other ways to display the output customization interface (300) and the invention should not be limited to only the interface displayed. In one or more embodiments, the output customization interface (300) and/or elements therein are associated with a specific project. Those skilled in the art will appreciate that associating elements of the output customization interface (300) with a specific project may allow for modification of output settings in association with that project only, thereby preventing unwanted modification of output settings associated with another project.

In one or more embodiments, the output customization interface (300) includes a navigation interface (105), navigation control (110), form title (115), forms subgroup (120), master navigation control (125), and/or output version heading (140), having functionality as described above in relation to FIG. 2, but applied to elements of the output customization interface (300). Further, in one or more embodiments, the output customization interface (300) includes an output initialization control (245) having functionality as described above in relation to FIG. 3. In one or more embodiments, the forms subgroup (120) displayed in the output customization interface (300) may be a filtered forms subgroup including a subset of form titles, depending, for example, on a value of a control in the output interface (200). Those skilled in the art will appreciate that filtering a forms subgroup (120) in this manner may allow the user to focus on changing only those settings relevant to the current project. Further, those skilled in the art will appreciate that the specific elements displayed in the output customization interface (300) may be different from the specific elements displayed in the default settings interface (100) and/or output interface (200).

In one or more embodiments, the output customization interface (300) includes a custom output setting control (310) describing a custom criterion for outputting an output version of the form (10). The custom output setting control (310) may be a dropdown, a checkbox, an input field, a button, or any other type of setting control. The custom output setting control (310) is enabled to accept a selection or input from a user to change its value. In one or more embodiments, the custom output setting control (310) has an initial value associated with the default output setting control (145), prior to a selection or input by a user. Further, in one or more embodiments, the output customization interface (300) includes a restore defaults control (335) configured to restore the custom output setting control (310) to the initial value. In one or more embodiments of the invention, the type of control and/or type of criterion used for the custom output setting control (310) may not be identical to those used by the default output setting control (145). Those skilled in the art will appreciate that a difference between the custom output setting control (310) and the default output setting control (145) may provide more relevant criteria in the context of a specific project.

In one or more embodiments, the output customization interface (300) includes a form page count (315) associated with the form (10). The form page count (315) may be an image, text, tool tip, audio, or any other representation of a page count. Further, in one or more embodiments, the output customization interface (300) includes a total page count (320) associated with the form page count (315). In one or more embodiments, the total page count (320) is dynamically updated based on a value of the custom output setting control (310).

In one or more embodiments, the output customization interface (300) includes an accept custom changes control (325) configured to accept a selection or input to the custom output setting control (310) and/or a discard custom changes control (330) configured to discard a selection or input to the custom output setting control (310). Those skilled in the art will appreciate that accepting a selection or input to the custom output setting control (310) may include storing a value of the custom output setting control (310) in a database, in a file, in volatile storage, or any other kind of settings acceptance action. In one or more embodiments, the acceptance action associated with the accept custom changes control (325) is different from the acceptance action associated with the accept default changes control (160). For example, the value of the custom output setting control (310) may be stored in a different location in a database than the value of the default output setting control (145). Those skilled in the art will appreciate that storing output settings in different locations may facilitate association of output settings with specific projects.

In one or more embodiments of the invention, when the output customization interface (300) is accessed, the custom output setting control (310) may describe a saved custom criterion (e.g., a custom criterion stored when the accept custom changes control (325) is used) for outputting an output version of the form (10). Alternatively, in one or more embodiments of the invention, when the output customization interface (300) is accessed, the custom output setting control (310) may describe a default custom criterion (e.g., a custom criterion based on a default output setting control, as described above). Further, in one or more embodiments of the invention, a persistence control (not shown) may be used to indicate whether the custom output setting control (310) should describe a saved custom criterion or a default custom criterion when the output customization interface (300) is accessed.

Figure 5:
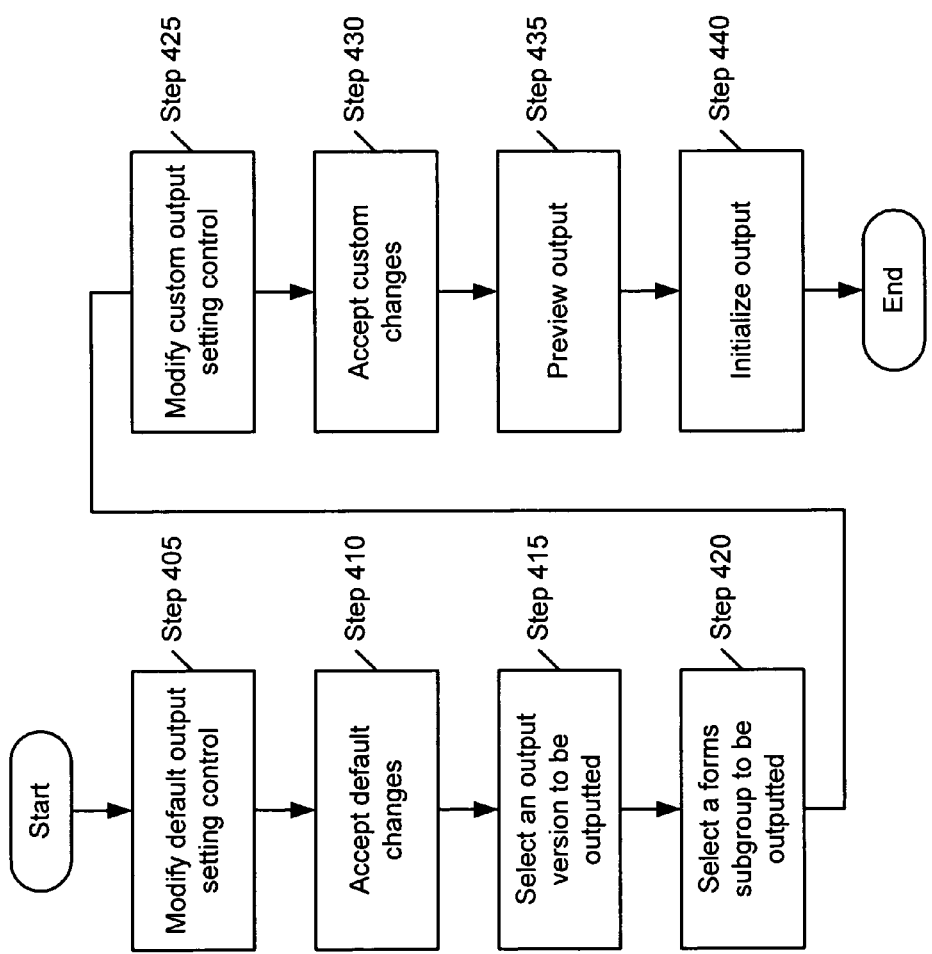
FIG. 5 shows a flowchart in accordance with one or more embodiments of the invention.

FIG. 5 shows a flowchart in accordance with one or more embodiments of the invention. Specifically, the flowchart shows steps for managing output settings in a form-based application. For example, these steps may be performed in a tax application, and may be performed using the graphical user interfaces of FIGS. 2-4. However, those skilled in the art will appreciate that these examples are provided for illustrative purposes only, and that these steps should not be limited to a tax application or the graphical user interfaces of FIGS. 2-4.

In Step 405, a user modifies a default setting output control to define a default output criterion for an output version of a form. For example, the default output criterion may specify that the output version is to be printed only if the form contains data at the time of print. Those skilled in the art will appreciate that outputting is not limited only to the function of printing; output may also be in the form of displaying on a screen, projecting the image, creating a digital image, etc. Further, many other output criteria may exist. For example, the criterion may specify that the output version will always be outputted, never be outputted, only be outputted if a specific value exists in the form, be outputted if required by a condition, or any other type of output criterion. In one or more embodiments, the default output setting control may be displayed in a default settings interface. Further, in one or more embodiments, the default output condition applies to all projects in the form-based application, unless a custom output setting control is modified. Modifying the custom output setting control is discussed in further detail below.

In one or more embodiments of the invention, modifying the default output setting control is dependent on displaying a title of the form in a navigation interface. For example, the user may first select a forms group using a forms group selection control. Selecting a forms group causes the navigation interface to display forms subgroups, one of which includes the form title. In one or more embodiments, the form title is displayed when the user uses a navigation control to expand a forms subgroup. Alternatively, the user may use a master navigation control to expand all forms subgroups, thereby displaying all form titles in the forms subgroups. Those skilled in the art will appreciate that there are many different ways to display a form title, and that a navigation interface may not be required to display the form title (i.e., the form title may already be displayed, or may be displayed by other means).

In one or more embodiments of the invention, when the form title is displayed, the default output setting control is also displayed. The default output setting control may be one of a plurality of setting controls associated with output versions of forms. The output versions may be identified by output version headings. In one or more embodiments of the invention, displaying the form title enables modifying the default output setting control.

In one or more embodiments of the invention, the user may discard the modification to the default setting control using a discard default changes control. Further, in one or more embodiments of the invention, the user may use a restore defaults control to restore the default output setting control to its initial condition—i.e., the value of the default output setting control prior to any user modifications. In one or more embodiments of the invention, the user may use a backup settings control to backup the values of the default output setting control and any other setting controls associated with output versions of a form.

In Step 410, the user accepts the modification of the default output setting control by, for example, using an accept default changes control. In one or more embodiments of the invention, the default output setting control is modified prior to beginning work on a project. However, those skilled in the art will appreciate that the user may be able to modify the default output setting control at any other time as well.

In one or more embodiments of the invention, when the user is ready to output an output version of the form, he or she may use an output interface to specify final output criteria. For example, the user may select an output version to be outputted (Step 415), a specific forms subgroup to be outputted (Step 420), an attachment to be outputted with the output version, and/or a number of copies of the output version to be outputted. In one or more embodiments, the forms subgroup may be selected by first choosing a forms subgroup from available forms subgroups, for example by using a subgroup choice control. Those skilled in the art will appreciate that any of these selections may be performed in any order or not at all, depending on the design of the form-based application. Further, those skilled in the art will appreciate that one or more of these selections may be made in a separate interface and/or during a separate user session.

In Step 425, the user modifies a custom output setting control associated with the output version of the form. In one or more embodiments, the custom output setting control may be displayed in an output customization interface. In one or more embodiments, prior to modifying the custom output setting control, the custom output setting control includes a value based on the default output setting control. For example, if the default output setting control indicates that the output version will be outputted if the form contains data, and the form does contain data, then the custom output setting control may indicate that the output version will be outputted. Alternatively, if the form does not contain data, the custom output setting control may indicate that the output version will not be outputted, or the custom output setting control may not be available at all for that output version. Those skilled in the art will appreciate that there are many different ways to associate the value of the custom output setting control with the default output setting control, and that the association may expedite outputting in cases where a modification of the custom output setting control is not desired.

In one or more embodiments, the custom output setting control is associated with a specific project the user is working on. For example, in a tax application, the custom output setting control may be associated with a specific client. Thus, in one or more embodiments, the custom output setting control may have different values depending on the currently loaded project. Those skilled in the art will appreciate that associating the custom output setting control with a specific project may allow for customization of output settings for each project independently.

Returning to discussion of Step 425, modifying the custom output setting control includes selecting an output criterion for the output version different from the output criterion specified by the default output setting control. For example, the custom criterion may indicate that the output version will always be outputted, even though the default output setting control may indicate that the output version will never be outputted. Accordingly, in one or more embodiments of the invention, after modifying the value of the custom output setting control, the value may no longer be associated with the default output setting control. In other words, depending on an implementation of the form-based application, modifying the default output setting control again may or may not also change the value of the custom output setting control.

In one or more embodiments of the invention, changing the value of the custom output setting control also changes the value of a total page count associated with the form. For example, if the new value indicates that the output version will be outputted, whereas it previously indicated that the output version would not be outputted, then the total page count may be updated to include the number of pages in the output version. Those skilled in the art will appreciate that if multiple output versions are selected to be outputted, the total page count may reflect the total number of pages in all the output versions to be outputted.

In Step 430, the user accepts the modification of the custom output setting control by, for example, using an accept custom changes control. In one or more embodiments, accepting the modification stores the value of the custom output setting control in association with the currently loaded project. Those skilled in the art will appreciate that storing the value of the custom output setting control in association with the currently loaded project may allow for output settings for different projects to be stored and managed independently.

In Step 435, the user previews the output according to his or her selections (e.g., according to the state of the form and/or the value of the custom output setting control), for example by using an output preview control. Alternatively, in one or more embodiments of the invention, the user may pass directly to Step 440, to initialize output of the output version.

In Step 440, the user initializes output of the output version of the form. As discussed above, the output may be a paper document, an electronic document such as a text file, PDF, Microsoft® Word document, an image, or any other type of output, and additional output steps may be performed by another application, such as a print driver, document creation interface, image rendering interface, or any other type of output application. In one or more embodiments, output is initialized using an output initialization control in an output interface or output customization interface. Those skilled in the art will appreciate that there are many other ways to initialize output.

While the steps shown in FIG. 5 have been described above in a particular order, those skilled in the art will appreciate that they may be performed in other orders as well. For example, the custom output setting control may be modified prior to selecting an output version to be outputted, or prior to selecting a forms subgroup to be outputted. Further, in one or more embodiments of the invention, one or more of these steps may not be required. For example, the user may not preview the output prior to initializing output. Accordingly, the scope of the invention is not limited to the order in which the steps are described herein.

Those skilled in the art will appreciate that in one or more embodiments, the invention reduces the complication and total number of settings changes required to output an output version of a form. Further, those skilled in the art will appreciate that the invention may be particularly useful for a plurality of forms groups, forms subgroups, forms, and/or output versions of a form.

Figure 6:
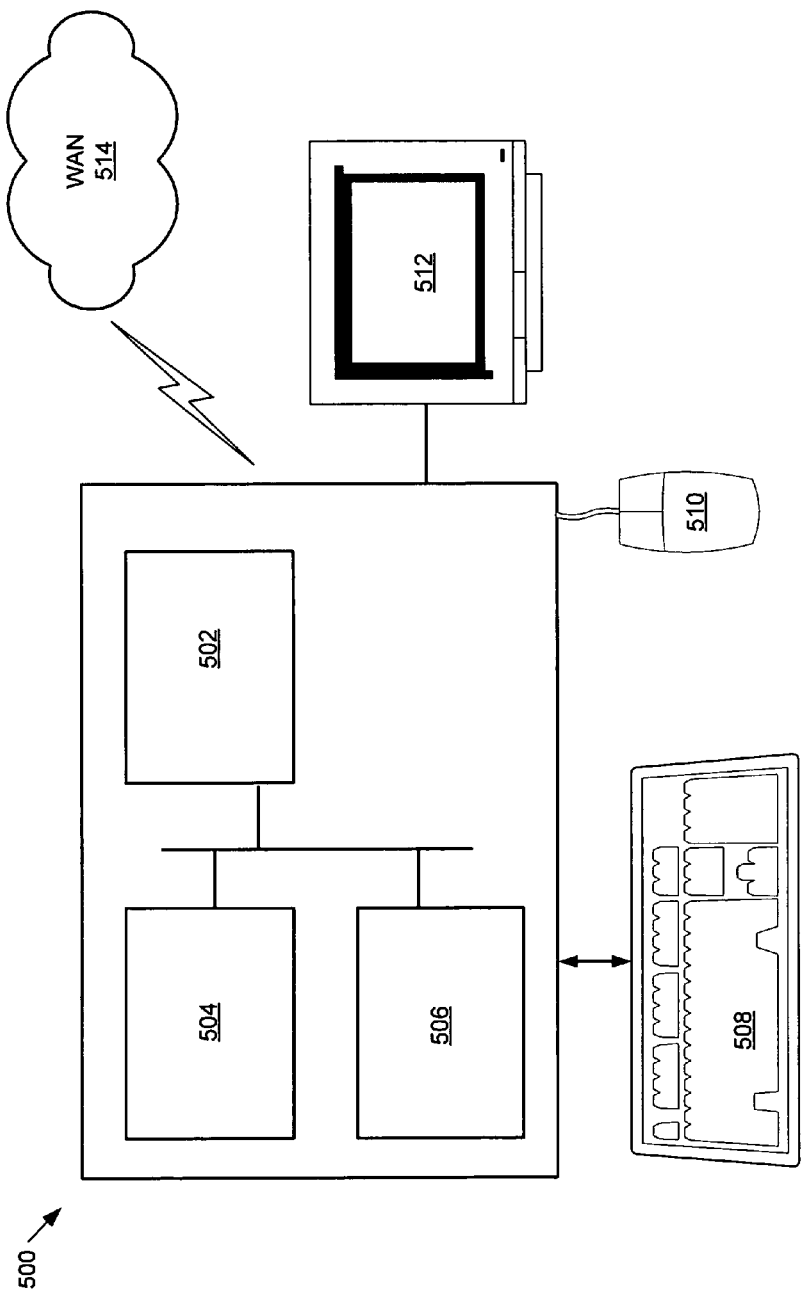
FIG. 6 shows a diagram of a computer system in accordance with one or more embodiments of the invention.

The invention may be implemented on virtually any type of computer regardless of the platform being used. For example, as shown in FIG. 6, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) may be connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., form, default settings interface, output interface, output customization interface, default output setting control, custom output setting control, etc.) may be located on a different node within the distributed system. In one or more embodiments of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer-readable medium comprising instructions for managing output settings for an output project of a form-based application, the output project comprising a plurality of output versions of the form-based application, by:
    selecting, for the output project, a comprehensive output version of the plurality of output versions, wherein the comprehensive output version comprises a first forms subgroup of a plurality of prepared forms of the form-based application and is configured for a first client of a preparer of the first forms subgroup;
    selecting, for the output project, a summary output version of the plurality of output versions, wherein the summary output version comprises the first forms subgroup and is configured for a second client of the preparer of the first forms subgroup;
    modifying an output setting control associated with the comprehensive output version by selecting an attachment, associated with the first forms subgroup, to the first forms subgroup, wherein the attachment is a copy of a document submitted by a user to provide support for content in one of the plurality of prepared forms; and
    printing, by selecting an output initialization control for the output project, both the comprehensive output version with the attachment and the summary output version without the attachment based on modified output setting control;
    wherein the comprehensive output version and the summary output version comprise different forms from the first forms subgroup compared to a filing output version of the plurality of output versions,
    wherein the filing output version is filed without the attachment, and wherein the first forms subgroup comprises the plurality of prepared forms of the form-based application and the attachment.

2. The computer-readable medium of claim 1, wherein modifying the output setting control comprises changing a value of the output setting control to be different from a value associated with a default output setting control.

3. The computer-readable medium of claim 1, wherein modifying the output setting control is enabled by clicking a navigation control in a navigation interface of the form-based application to display a title of the comprehensive output version.

4. The computer-readable medium of claim 3, wherein the title of the comprehensive output version is displayed in the first forms subgroup.

5. The computer-readable medium of claim 4, further comprising instructions to perform:
    modifying a forms group selection control to display the first forms subgroup.

6. The computer-readable medium of claim 4, wherein the first forms subgroup comprises a forms category.

7. The computer-readable medium of claim 1, further comprising instructions to perform:
    modifying a value of a number of copies control associated with the summary output version, wherein a different number of copies of the summary output version are outputted based on modifying the value of the number of copies control.

8. The computer-readable medium of claim 1, further comprising instructions to perform:
    displaying a form page count associated with one of the comprehensive output version, wherein the form page count identifies a number of pages for the comprehensive output version.

9. The computer-readable medium of claim 1, further comprising instructions to perform:

updating a total page count associated with the summary output version, based on modifying a value associated with the output setting control.

10. The computer-readable medium of claim 1, further comprising instructions to perform:
    generating an output preview of the summary output version based on modifying a value associated with the output setting control.

11. The computer-readable medium of claim 1, wherein the form-based application is a financial management application.

12. The computer-readable medium of claim 1, wherein the form-based application is a tax preparation application.

13. A graphical user interface displayed using a processor of a computer system, the graphical user interface comprising functionality for managing output settings for an output project of a form-based application, wherein the output project comprises a plurality of output versions of the form-based application, the graphical user interface further comprising:
    an output setting control associated with a summary output version of the plurality of output versions and a comprehensive output version of the plurality of output versions,
    wherein the summary output version and the comprehensive output version each comprise a first forms subgroup of a plurality of prepared forms of the form-based application,
    wherein the summary output version is configured for a first client of a preparer of the first forms subgroup, and
    wherein the comprehensive output version is configured for a second client of the preparer of the first forms subgroup; and
    a navigation interface configured to:
        display a title of the summary output version and the comprehensive output version of the first forms subgroup;
        enable a modification of the output setting control associated with the comprehensive output version by selecting an attachment, associated with the first forms subgroup to the first forms subgroup, wherein the attachment is a copy of a document submitted by a user to provide support for content in one of the plurality of prepared forms; and
        printing, by selecting an output initialization control for the output project, both the summary output version without the attachment and the comprehensive output version with the attachment based on the modification of the output setting control,
    wherein the comprehensive output version and the summary output version comprise different forms from the first forms subgroup compared to a filing output version of the plurality of output versions,
    wherein the filing output version is filed without the attachment, and
    wherein the first forms subgroup comprises the plurality of prepared forms of the form-based application and the attachment.

14. The graphical user interface of claim 13, wherein the modification of the output setting control comprises changing a value of the output setting control to be different from a value associated with a default output setting control.

15. The graphical user interface of claim 13, wherein the navigation interface comprises a navigation control configured to expand the first forms subgroup and display a title of the summary output version.

16. The graphical user interface of claim 13, wherein the first forms subgroup is displayed based on a modification of a forms group selection control.

17. The graphical user interface of claim 13, wherein the first forms subgroup comprises a forms category.

18. The graphical user interface of claim 13, wherein the summary output version is outputted a predefined number of times based on a number of copies control.

19. The graphical user interface of claim 13, further comprising:
    a form page count associated with the first forms subgroup, wherein the form page count identifies a number of pages for the first forms subgroup.

20. The graphical user interface of claim 13, further comprising:
    a total page count updated based on the modification of the output setting control, wherein the total page count identifies a total number of pages outputted based on the output setting control.

21. The graphical user interface of claim 13, wherein an output preview of the summary output version is generated based on the modification of the output setting control.

22. The graphical user interface of claim 13, wherein the form-based application is a financial management application.

23. The graphical user interface of claim 13, wherein the form-based application is a tax preparation application.

* * * * *